(12) United States Patent
Vondrell et al.

(10) Patent No.: US 10,837,304 B2
(45) Date of Patent: Nov. 17, 2020

(54) HYBRID-ELECTRIC DRIVE SYSTEM

(71) Applicant: General Electric Company, Schenectady, NY (US)

(72) Inventors: Randy M. Vondrell, Cincinnati, OH (US); Glenn Crabtree, Oregonia, OH (US)

(73) Assignee: General Electric Company, Schenectady, NY (US)

( * ) Notice: Subject to any disclaimer, the term of this patent is extended or adjusted under 35 U.S.C. 154(b) by 922 days.

(21) Appl. No.: 15/377,080

(22) Filed: Dec. 13, 2016

(65) Prior Publication Data
US 2018/0163558 A1 Jun. 14, 2018

(51) Int. Cl.
| | |
|---|---|
| *F01D 15/10* | (2006.01) |
| *F02C 7/36* | (2006.01) |
| *B64D 27/10* | (2006.01) |
| *B64D 27/24* | (2006.01) |
| *F16D 41/069* | (2006.01) |

(Continued)

(52) U.S. Cl.
CPC ............ *F01D 15/10* (2013.01); *B64D 27/10* (2013.01); *B64D 27/24* (2013.01); *B64D 35/08* (2013.01); *F02C 7/36* (2013.01); *F16D 41/069* (2013.01); *F16D 48/06* (2013.01); *B64D 2027/026* (2013.01); *F05D 2220/32* (2013.01); *F05D 2220/76* (2013.01); *F05D 2240/60* (2013.01); *F05D 2260/4023* (2013.01); *F16D 2500/10412* (2013.01); *F16D 2500/10493* (2013.01); *F16D 2500/3065* (2013.01); *Y02T 50/64* (2013.01)

(58) Field of Classification Search
None
See application file for complete search history.

(56) References Cited

U.S. PATENT DOCUMENTS

| | | |
|---|---|---|
| 3,673,802 A | 7/1972 | Krebs et al. |
| 3,729,957 A | 5/1973 | Petrie et al. |

(Continued)

FOREIGN PATENT DOCUMENTS

| | | |
|---|---|---|
| CN | 204726648 U | 10/2015 |
| DE | 10 2013 209 538 A1 | 11/2014 |

(Continued)

OTHER PUBLICATIONS

T.J. Cyders; Analysis and Experimental Comparaison of Models of a New Form of Continuously Variable Transmission; Ph.D. Thesis; Russ College of Engineering and Technology; Ohio University; Dec. 2012.*

(Continued)

*Primary Examiner* — Steven M Sutherland
*Assistant Examiner* — Rodolphe Andre Chabreyrie
(74) *Attorney, Agent, or Firm* — Dority & Manning, P.A.

(57) ABSTRACT

A propulsion system includes a propulsor having a driveshaft, an electric machine coupled to the driveshaft of the propulsor, and a combustion engine having an output shaft. The propulsion system additionally includes a one-way clutch operable with at least one of the driveshaft of the propulsor and the output shaft of the combustion engine. The one-way clutch allows for a differential angular velocity of the driveshaft relative to the output shaft in a first circumferential direction and prevents a differential angular velocity of the driveshaft relative to the output shaft in a second circumferential direction.

17 Claims, 8 Drawing Sheets

(51) Int. Cl.
  F16D 48/06  (2006.01)
  B64D 35/08  (2006.01)
  B64D 27/02  (2006.01)

(56) References Cited

U.S. PATENT DOCUMENTS

| | | |
|---|---|---|
| 4,615,008 A | 9/1986 | Rosenbush et al. |
| 4,625,280 A | 11/1986 | Couch |
| 4,635,771 A * | 1/1987 | Shoji ................ F16D 41/07 192/41 A |
| 4,751,816 A | 6/1988 | Perry |
| 7,819,625 B2 | 10/2010 | Merrill et al. |
| 7,916,311 B2 | 3/2011 | Corn et al. |
| 8,177,474 B2 | 5/2012 | Andarawis et al. |
| 9,063,030 B2 | 6/2015 | Slemp |
| 9,174,741 B2 | 11/2015 | Suntharalingam et al. |
| 9,322,280 B2 | 4/2016 | Funk et al. |
| 9,395,270 B2 | 7/2016 | Czerniak et al. |
| 9,789,768 B1 * | 10/2017 | Meier ................ B60L 8/003 |
| 2008/0006739 A1 | 1/2008 | Mochida et al. |
| 2008/0184906 A1 * | 8/2008 | Kejha ................ B64C 39/024 102/374 |
| 2012/0209456 A1 | 8/2012 | Harmon et al. |
| 2013/0133480 A1 * | 5/2013 | Donnelly ............ B60K 6/36 74/720 |
| 2015/0274306 A1 * | 10/2015 | Sheridan ............ F02C 7/36 60/772 |
| 2016/0018961 A1 | 1/2016 | Williams |
| 2016/0340051 A1 | 11/2016 | Edwards et al. |
| 2016/0355272 A1 * | 12/2016 | Moxon ............ B64D 35/04 |
| 2017/0190435 A1 * | 7/2017 | Kobayashi .......... B64D 27/24 |
| 2017/0320584 A1 * | 11/2017 | Menheere .......... B64D 27/10 |

FOREIGN PATENT DOCUMENTS

| | | |
|---|---|---|
| EP | 2 735 512 A1 | 5/2014 |
| EP | 2 962 885 A1 | 1/2016 |
| EP | 3 002 435 A1 | 4/2016 |

OTHER PUBLICATIONS

Co-Pending U.S. Appl. No. 15/278,482, filed Sep. 28, 2016.
Extended European Search Report and Opinion issued in connection with corresponding EP Application No. 17206819.9 dated Apr. 13, 2018.
Machine Translated Chinese Office Action Corresponding to Application No. 201711327418 dated Jul. 3, 2020.

* cited by examiner

HYBRID-ELECTRIC DRIVE SYSTEM

FIELD

The present subject matter relates generally to a hybrid-electric propulsion system utilizing a gas turbine engine.

BACKGROUND

A turbine engine of an exemplary gas turbine engine generally includes, in serial flow order, a compressor section, a combustion section, and a turbine section. In operation, ambient air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section.

With certain propulsion systems, the turbine engine of the gas turbine engine may be used to drive, e.g., a propeller. Further, with certain propulsion systems, a secondary power source may be used to supplement an amount of power provided to the propeller by the gas turbine engine, or alternatively, to substitute the power provided to the propeller by the gas turbine engine. With the latter case, complications may arise if the secondary power source additionally causes rotation of certain components of the gas turbine engine without the gas turbine engine operating.

Accordingly, a propulsion system including a secondary power source capable of supplementing or substituting power provided by a gas turbine engine capable of overcoming the above obstacles would be particularly useful in the art.

BRIEF DESCRIPTION

Aspects and advantages of the invention will be set forth in part in the following description, or may be obvious from the description, or may be learned through practice of the invention.

In one exemplary embodiment of the present disclosure, a propulsion system is provided. The propulsion system includes a driveshaft, an electric machine coupled to the driveshaft, and a combustion engine having an output shaft. The propulsion system additionally includes a one-way clutch operable with at least one of the driveshaft and the output shaft of the combustion engine. The one-way clutch allows for a differential angular velocity of the driveshaft relative to the output shaft in a first circumferential direction and prevents a differential angular velocity of the driveshaft relative to the output shaft in a second circumferential direction.

In an exemplary aspect of the present disclosure, a method of operating a propulsion system is provided. The propulsion system includes a propulsor including a driveshaft, an electric machine coupled to the driveshaft, a combustion engine having an output shaft, and a one-way clutch operable with at least one of the driveshaft of the propulsor and the output shaft of the combustion engine. The method includes operating the propulsion system to power the propulsor at least in part with the combustion engine such that the one-way clutch couples the output shaft of the combustion engine to the driveshaft of the propulsor. The method also includes operating the propulsion system to power the propulsor at least in part with the electric machine such that the one-way clutch decouples the output shaft of the combustion engine from the driveshaft of the propulsor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
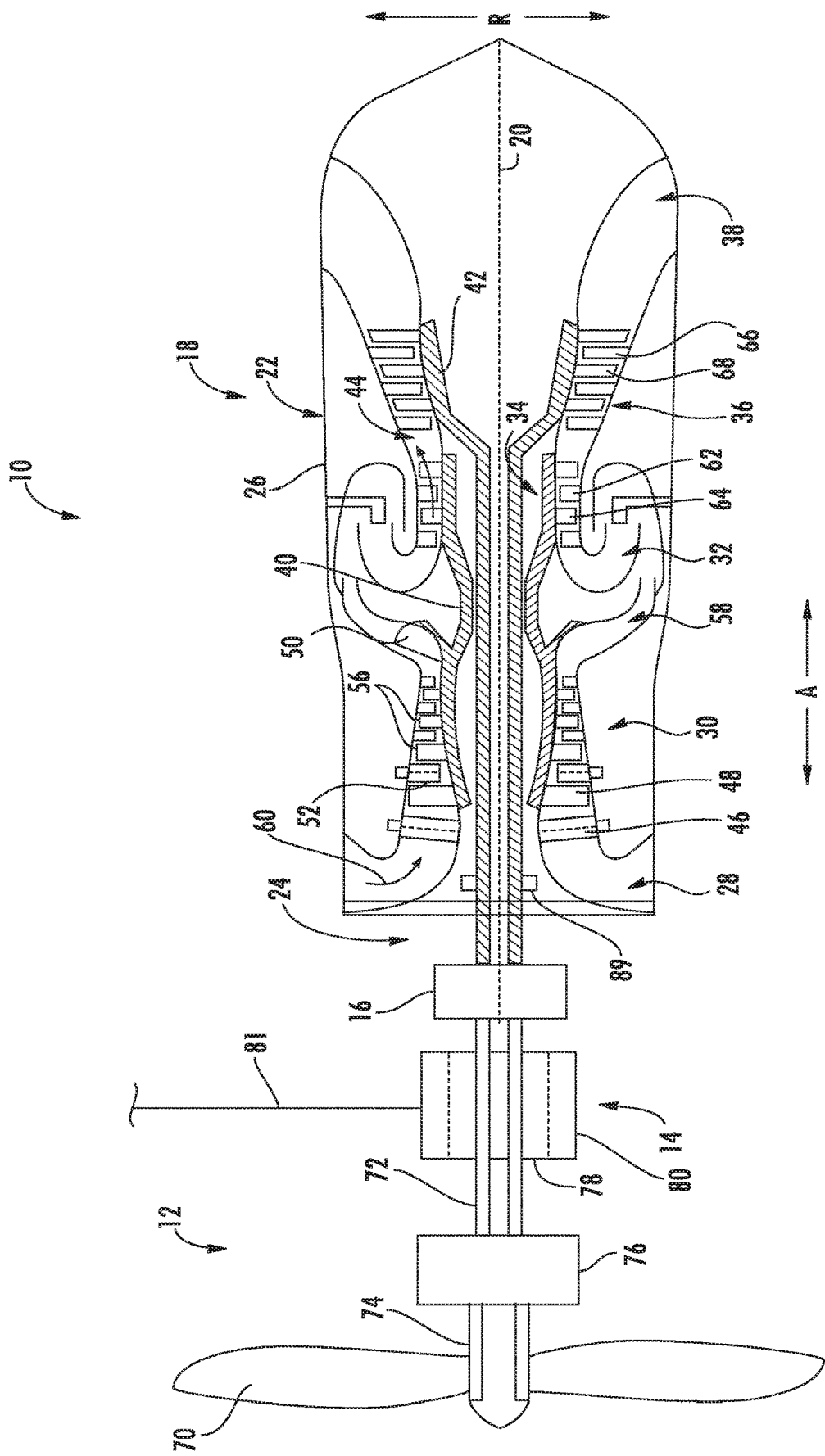
FIG. 1 is a schematic view of a propulsion system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic view of a propulsion system 10 in accordance with an exemplary embodiment of the present disclosure. For the embodiment depicted, the propulsion system 10 generally includes a gas turbine engine (a schematic, cross-sectional view of which is provided in FIG. 1), a propulsor 12, an electric machine 14, and a one-way clutch 16. Each of these components, and their respective operability within the exemplary propulsion system 10 depicted, is described in greater detail below.

Referring first to the exemplary gas turbine engine, it will be appreciated that the gas turbine engine depicted is configured as a turboshaft engine, referred to herein as "turboshaft engine 18." However, as is discussed in greater detail below in other exemplary embodiments, the turboshaft engine 18 may instead be configured in any other suitable manner. For example, in other exemplary embodiments, the turboshaft engine 18 may instead be configured as a turboprop engine, a turbofan engine, or any other suitable combustion engine (such as any other suitable gas turbine engine or, e.g., internal combustion engine).

Figure 2:
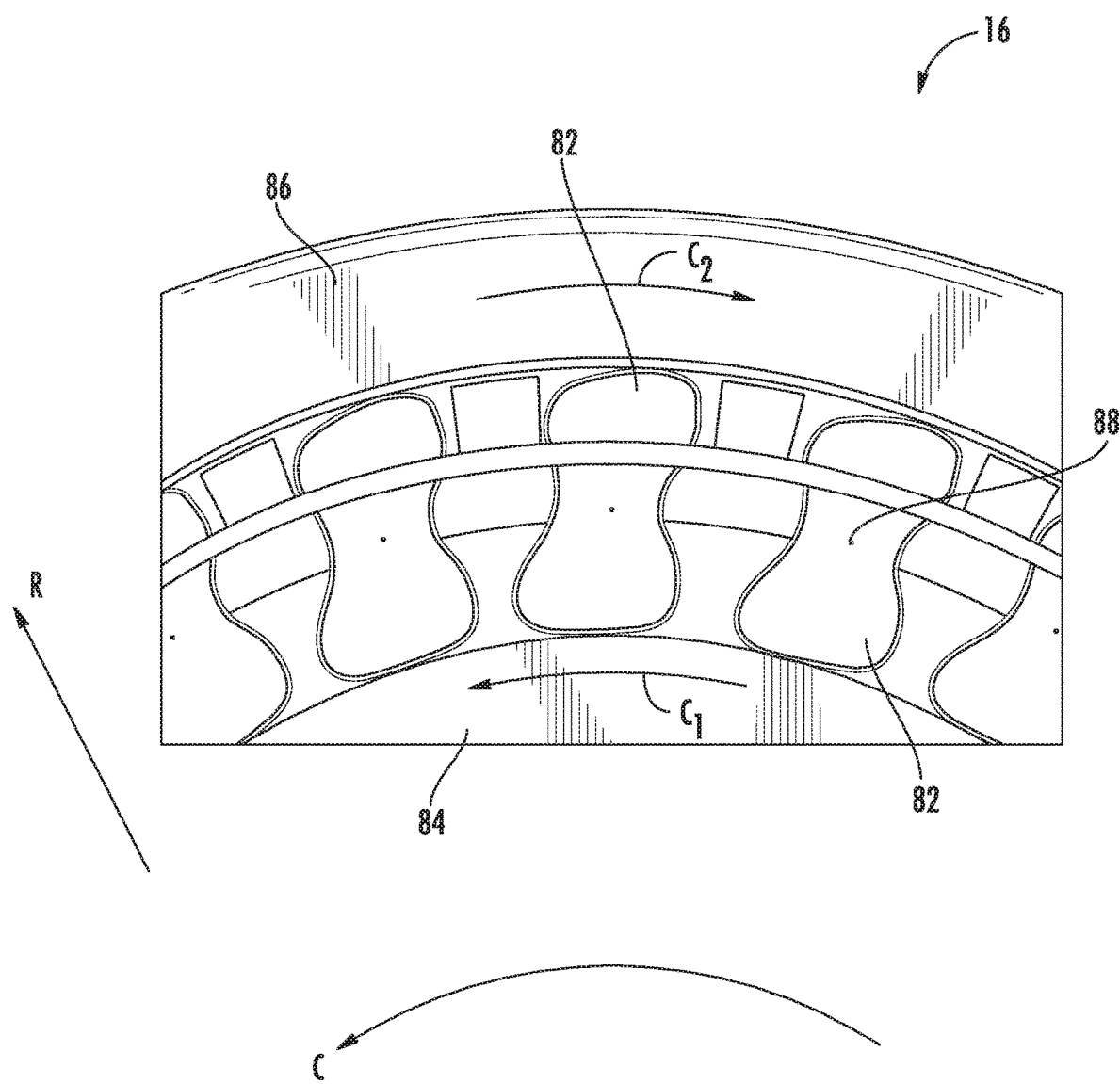
FIG. 2 is close-up, cross-sectional view of a one-way clutch in accordance with an exemplary embodiment of the present disclosure, as may be incorporated in the exemplary propulsion system of FIG. 1.

As shown in FIG. 1, the turboshaft engine 18 defines an axial direction A (extending parallel to a longitudinal centerline 20 provided for reference), a radial direction R, and a circumferential direction C (i.e., a direction extending about the axial direction A; see FIG. 2). In general, the turboshaft engine 18 includes a turbine engine 22 and an output shaft 24.

The exemplary turbine engine 22 depicted generally includes a substantially tubular outer casing 26 that partially encloses an annular, radial inlet duct 28. The radial inlet duct 28 includes at least a portion extending generally along the radial direction R, and is further configured to turn a direction of an air flow therethrough, such that the resulting airflow is generally along the axial direction A. Additionally, the outer casing 26 encases, in serial flow relationship, a compressor section including a single compressor 30; a combustion section including a reverse flow combustor 32; a turbine section including a high pressure (HP) turbine 34 and a low pressure (LP) turbine 36; and an exhaust section 38. Moreover, the turboshaft engine 18 depicted is a dual-spool engine, including a first, high pressure (HP) shaft or spool 40 coupling the HP turbine 34 to the compressor 30, and a low pressure (LP) shaft or spool 42 coupled to the LP turbine 36, and drivingly connecting the LP turbine 36 to the output shaft 24.

The compressor section, combustion section, turbine section, and exhaust section 38 together define a turbine engine air flowpath 44 through the turbine engine 22. Notably, for the embodiment depicted, the turbine engine 22 further includes a stage of inlet guide vanes 46 at a forward end of the turbine engine air flowpath 44. Specifically, the inlet guide vanes 46 are positioned at least partially within the radial inlet duct 28, the radial inlet duct 28 located upstream of the compressor section, including the compressor 30. For the embodiment depicted, the exemplary stage of inlet guide vanes 46 are configured as variable inlet guide vanes. It should be appreciated, however, that in other exemplary embodiments, the inlet guide vanes 46 may instead be configured as fixed inlet guide vanes, and further may be located at any other suitable location within the radial inlet duct 28.

Furthermore, the compressor 30 of the compressor section includes a plurality of stages of compressor rotor blades. More specifically, for the embodiment depicted, the compressor 30 of the compressor section includes four stages of radially oriented compressor rotor blades 48, and an additional stage of centrifugal compressor rotor blades 50. Additionally, between each stage of compressor rotor blades 48, 50, the compressor section includes a stage of compressor stator vanes. Notably, the first stage of compressor stator vanes is configured as a stage of variable compressor stator vanes 52. By contrast, the remaining stages of compressor stator vanes are configured as fixed compressor stator vanes 56. It should be appreciated, however, that in other exemplary embodiments, the compressor 30 may have any other suitable configuration, including any other suitable number of stages of compressor rotor blades 48, 50 and any suitable number of stages of variable and/or fixed compressor stator vanes 52, 56.

As is depicted, the turbine engine 22 further includes a transition duct 58 immediately downstream of the compressor 30, the transition duct 58 having at least a portion extending generally along the radial direction R to provide a compressed air flow from the compressor 30 to the reverse flow combustor 32. The stage of centrifugal compressor rotor blades 50 are configured to assist with turning the compressed air within the compressor section radially outward into the transition duct 58. Notably, however, in other exemplary embodiments, the combustion section may not include the reverse flow combustor 32, and instead may include any suitable forward-flow combustor, such as a can combustor, cannular combustor, or annular combustor. With such an exemplary embodiment, the compressor 30 may not include the stage of centrifugal compressor rotor blades 50.

It will be appreciated, that during operation of the turboshaft engine 18, a volume of air 60 enters the turboshaft engine 18 through the radial inlet duct 28, and flows across the inlet guide vanes 46 and into the compressor 30 of the compressor section. A pressure of the air 60 is increased as it is routed through the compressor 30, and is then provided to the reverse flow combustor 32 of the combustion section, where the air is mixed with fuel and burned to provide combustion gases. The combustion gases are routed through the HP turbine 34 where a portion of thermal and/or kinetic energy from the combustion gases is extracted via sequential stages of HP turbine stator vanes 62 that are coupled to the outer casing 26 and HP turbine rotor blades 64 that are coupled to the HP shaft 40, thus causing the HP shaft 40 to rotate, thereby supporting operation of the compressor 30. The combustion gases are then routed through the LP turbine 36 where a second portion of thermal and kinetic energy is extracted from the combustion gases via sequential stages of LP turbine stator vanes 66 that are coupled to the outer casing 26 and LP turbine rotor blades 68 that are coupled to the LP shaft 42, thus causing the LP shaft 42 to rotate, thereby supporting operation of the output shaft 24. The combustion gases are subsequently routed through the exhaust section 38 of the turbine engine 22.

As briefly stated, the LP shaft 42 is coupled to the LP turbine 36, and is further mechanically coupled to the driveshaft 24. The driveshaft 24 of the turboshaft engine 18 is operable with the various other components of the propulsion system 10.

Referring still to FIG. 1, for the embodiment depicted, the propulsor 12 generally includes a propeller 70 and a driveshaft 72 configured for rotating the propeller 70. More specifically, the propulsor 12 includes the propeller 70, a propeller shaft 74, a gearbox 76, and the driveshaft 72. The driveshaft 72 is configured for rotating the propeller 70 across the gearbox 76, and more specifically still, the driveshaft 72 is configured for rotating the propeller shaft 74 across the gearbox 76, which in turn rotates the propeller 70. However, in other exemplary embodiments, the propulsor 12 may be configured in any other suitable manner.

The propulsion system 10 further includes an electric machine 14 coupled to the driveshaft 72 of the propulsor 12.

The electric machine 14 generally includes a rotor 78 fixedly coupled to the driveshaft 72 and a stator 80, which is configured to remain stationary. In addition, the electric machine 14 includes an electrical line 81 for electrically connecting the stator 80 and/or rotor 78 of the electric machine 14 to a power source and/or a power sink. The electric machine 14 is depicted as an in-runner electric machine 14 (i.e., an electric machine 14 with the rotor 78 located radially inward of the stator 80). It should be appreciated, however, that in other embodiments, the electric machine 14 may have any other suitable configuration. For example, in other embodiments, the stator 80 may instead be located inward of the rotor 78 along the radial direction R (i.e., as an out-runner machine), or alternatively may be configured in an axial flux configuration. Depending on an operating condition of the propulsion system 10, and a particular configuration of the propulsion system 10, the electric machine 14 may be configured as either an electric generator configured to take power out of the propulsion system 10 (i.e., utilize a rotation of the driveshaft 72 of the propulsor 12 to generate electrical power) or alternatively as an electric motor configured to add power to the propulsion system 10 (i.e., to drive or assist in driving the driveshaft 72 of the propulsor 12).

In order to effectively facilitate the various operating conditions of the electric machine 14, the exemplary propulsion system 10 of FIG. 1 includes a one-way clutch 16 operable with at least one of the driveshaft 72 of the propulsor 12 and the output shaft 24 of the gas turbine engine (i.e., with the driveshaft 72, with the output shaft 24, or with both the driveshaft 72 and output shaft 24). More particularly, for the embodiment depicted the one-way clutch 16 is operable with at least one of the driveshaft 72 of the propulsor 12 and output shaft 24 of the turboshaft engine 18 at a location between the electric machine 14 and the turbine engine 22. The one-way clutch 16 allows for a differential angular velocity of the driveshaft 72 relative to the output shaft 24 in a first circumferential direction C1 and prevents a differential angular velocity of the driveshaft 72 relative to the output shaft 24 in a second circumferential direction C2 (i.e., a circumferential direction C opposite the first circumferential direction C1; see FIG. 2).

More specifically, for the embodiment depicted, the one-way clutch 16 is configured to decouple the driveshaft 72 of the propulsor 12 from the output shaft 24 of the turboshaft engine 18 passively based on an angular velocity of the output shaft 24 (i.e., a rotational speed along the circumferential direction C) generated by the turbine engine 22 relative to an angular velocity of the driveshaft 72 (i.e., a rotational speed along the circumferential direction C) generated by the electric machine 14. More specifically, still, for the embodiment depicted, the one-way clutch 16 is configured to decouple the driveshaft 72 of the propulsor 12 from the output shaft 24 of the gas turbine engine based on an amount of power applied to the output shaft 24 by the turbine engine 22 of the turboshaft engine 18 relative to an amount of power applied to the driveshaft 72 by the electric machine 14. For example, the one-way clutch 16 for the embodiment of FIG. 1 is configured to decouple the driveshaft 72 of the propulsor 12 from the output shaft 24 of the gas turbine engine when the power applied to the driveshaft 72 by the electric machine 14 exceeds the power applied to the output shaft 24 by the turbine engine 22 by a predetermined threshold. The predetermined threshold may be based on a particular configuration of the propulsion system 10. For example, the predetermined threshold may be a fixed amount, or alternatively may be a ratio of power applied to the driveshaft 72 by the electric machine 14 to a power applied to the output shaft 24 by the turbine engine 22. Conversely, the one-way clutch 16 is configured to couple the driveshaft 72 of the propulsor 12 to the output shaft 24 of the gas turbine engine when the power applied to the driveshaft 72 by the electric machine 14 is less than or equal to the power applied to the output shaft 24 by the turbine engine 22 of the turboshaft engine 18.

More particularly, for the embodiment depicted, the one-way clutch 16 is configured as a mechanical one-way clutch, passively controlled by the output shaft 24 of the turboshaft engine 18 and the driveshaft 72 of the propulsor 12. For example, in certain exemplary embodiments, the one-way clutch 16 may be configured as at least one of a sprag clutch or a cam clutch. For example, referring briefly to FIG. 2, the one-way clutch 16 may be configured as a sprag clutch. FIG. 2 depicts schematically a one-way clutch 16 having such a configuration (i.e., as a sprag clutch) as may be incorporated in the exemplary propulsion system 10 of FIG. 1. The exemplary sprag clutch depicted includes a plurality of sprags 82 positioned between an inner race 84 and an outer race 86. The outer race 86 may be fixed to the output shaft 24 of the turboshaft engine 18 and the inner race 84 may be fixed to the driveshaft 72 of the propulsor 12 (see FIG. 1). When the inner race 84 rotates counterclockwise relative to the outer race 86 (such that there is a positive differential angular velocity of the driveshaft 72 relative to the output shaft 24 in the first circumferential direction C1), the plurality sprags 82 provide substantially no resistance to such movement. Therefore, the sprag clutch allows for the positive differential angular velocity between the inner race 84/driveshaft 72 and outer race 86/output shaft 24 and the first circumferential direction C1. By contrast, when the inner race 84 attempts to rotate clockwise relative to the outer race 86, the plurality of sprags 82 rotate about each of their respective axes of rotation 88 and lock the inner race 84 to the outer race 86, such that no relative rotation of the inner race 84 to the outer race 86 in the clockwise direction is allowed. Accordingly, the sprag clutch prevents a positive differential angular velocity between the inner race 84/driveshaft 72 and outer race 86/output shaft 24 and the second circumferential direction C2.

Referring still to FIG. 1, the exemplary propulsion system 10 further includes a brake 89 operable with the LP shaft 42. The brake 89 may engage the LP shaft 42 to slow down the LP shaft 42 and disengage the one-way clutch 16. The brake 89 may be any suitable brake 89, including, for example, a friction brake operable with the LP shaft 42.

It should be appreciated, however, that in other embodiments, any other suitable one-way clutch 16 may be utilized, and further, the one-way clutch 16 may be positioned at any other suitable location.

Furthermore, it should be appreciated that in other exemplary embodiments, the propulsion system 10 may be configured in any other suitable manner. For example, in other exemplary embodiments, the turboshaft engine may instead be configured as a reverse flow engine, such that the LP shaft 42 is coupled to an output shaft 24 at a location downstream of the turboshaft engine 10. Additionally, in still other exemplary embodiments, the propulsion system 10 may not be an aeronautical propulsion system. For example, in other exemplary embodiments the driveshaft 72 may not be configured as part of the propulsor 12, and instead may be utilized for driving any other suitable vehicle. For example, in other exemplary embodiments, the propulsion system may be a locomotive propulsion system and the driveshaft 72 may be configured as a driveshaft for rotating wheels of a train car. Other embodiments are also within the scope of this disclosure. For example, in still other exemplary embodiments, the propulsion system 10 may include any other suitable combustion engine (i.e., in place of turboshaft engine 18), such as any other suitable gas turbine engine, or any suitable internal combustion engine.

Figure 3:
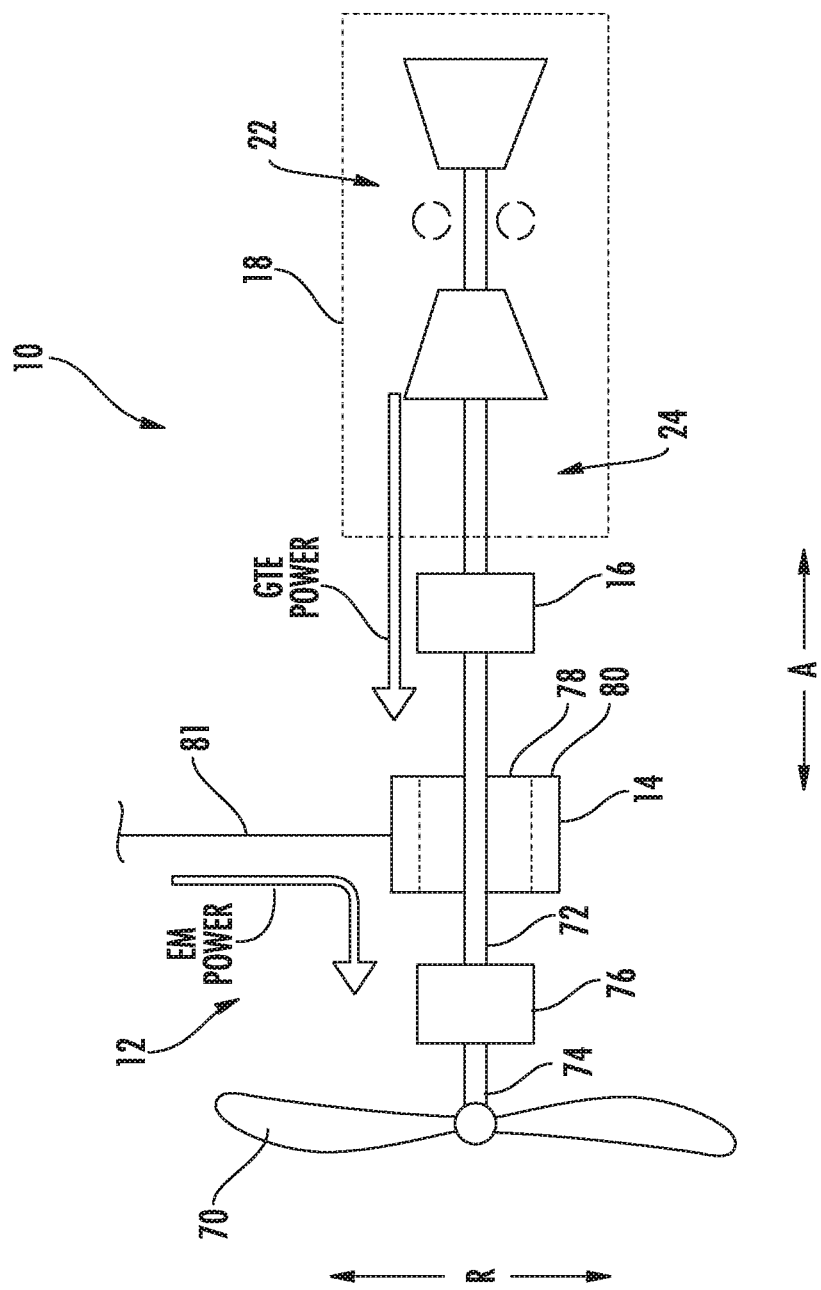
FIG. 3 is a schematic view of a propulsion system in accordance with another exemplary embodiment of the present disclosure.
Figure 4:
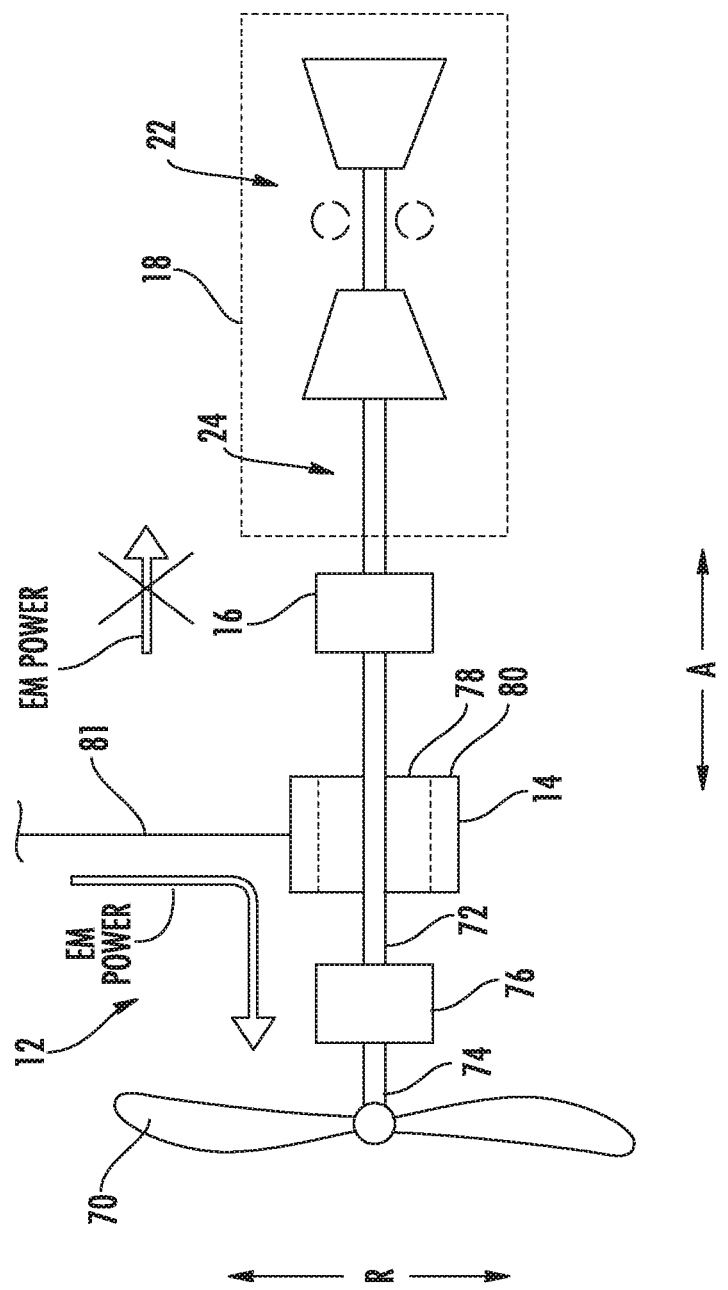
FIG. 4 is a schematic view of a propulsion system in accordance with yet another exemplary embodiment of the present disclosure.
Figure 5:
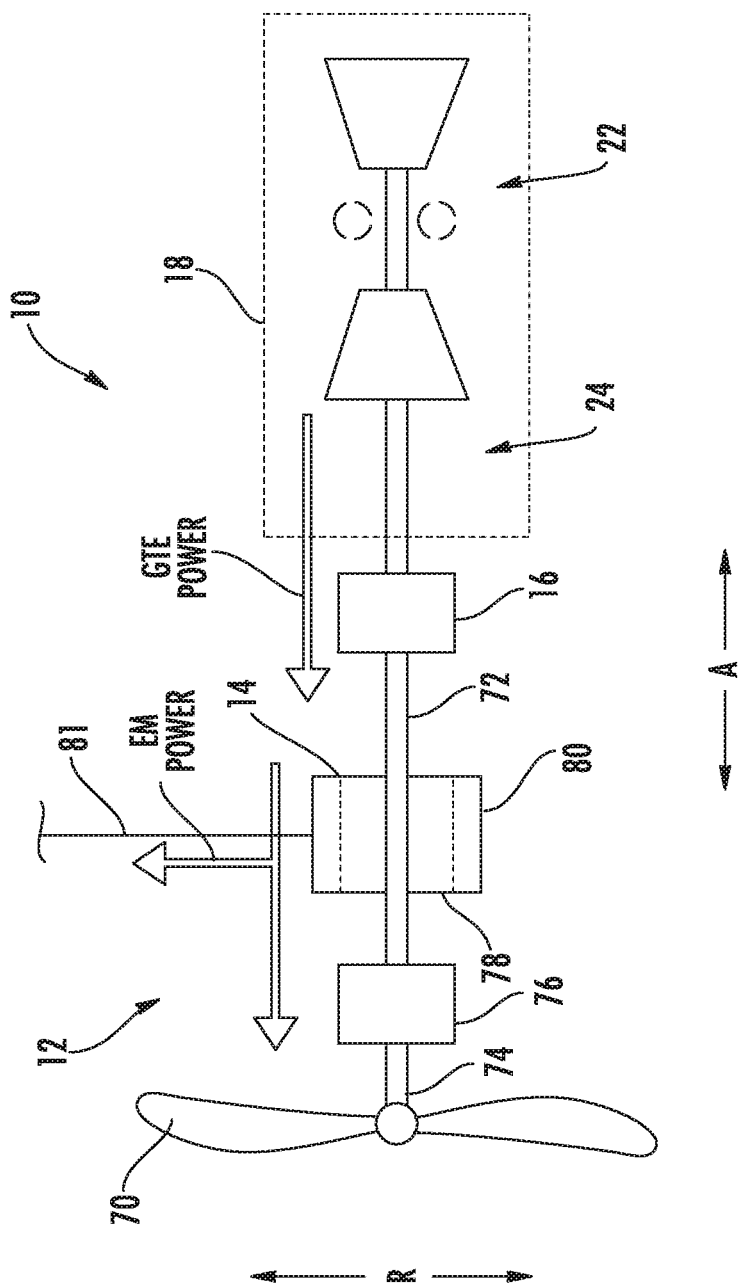
FIG. 5 is a schematic view of a propulsion system in accordance with still another exemplary embodiment of the present disclosure.

Referring now generally to FIGS. 3 through 5, operation of the propulsion system 10 in accordance with an exemplary embodiment of the present disclosure will be described. FIGS. 3 through 5 each depict schematically a propulsion system 10 which may be configured in substantially the same manner as exemplary propulsion system 10 described above with reference to FIG. 1. Accordingly, the same or similar numbers refer to the same or similar part.

For example, the exemplary propulsion systems 10 depicted in FIGS. 3 through 5 generally include a propulsor 12 having a propeller 70, a gearbox 76, and a driveshaft 72; an electric machine 14 coupled to the driveshaft 72 of propulsor 12 and including an electrical line 81; a turboshaft engine 18 including a turbine engine 22 and an output shaft 24 rotatable with, and by, the turbine engine 22; and a one-way clutch 16 operable with at least one of the driveshaft 72 of the propulsor 12 and output shaft 24 of the turboshaft engine 18.

Referring particularly to FIG. 3, the propulsion system 10 depicted utilizes the electric machine 14 as an electric motor and further uses the turboshaft engine 18 as a power source. For example, in FIG. 3, the turbine engine 22 of the turboshaft engine 18 may apply a first GTE power to the output shaft 24. Similarly, the electric machine 14 (operating as an electric motor) may receive electrical power from the electrical line 81 and convert the electrical power to a mechanical power, i.e., a first EM power, applied to the driveshaft 72 of the propulsor 12. The first EM power may be within a predetermined threshold of the first GTE power for the embodiment of FIG. 3. For example, the first EM power may be less than or equal to the first GTE power for the embodiment of FIG. 3. Based on this relative power application to the driveshaft 72, the one-way clutch 16 is operable to couple the output shaft 24 of the turboshaft engine 18 to the driveshaft 72 of the propulsor 12, such that each of the electric machine 14 (operating as an electric motor) and turboshaft engine 18 operate to drive the propulsor 12.

Such a configuration may allow for the propulsion system 10 to have access to an amount of power during certain high-power operation modes greater than would otherwise be available by the turboshaft engine 18 alone. For example, such a configuration may allow for the propulsion system 10 to drive a propulsor 12 using the turboshaft engine 18 and electric machine 14 (e.g., as a supplemental power source) during takeoff operating modes or other high-power operating modes. With such a configuration, the turboshaft engine 18 may be designed to operate most efficiently during relatively low power modes, such as during cruise operations, potentially resulting in an overall more efficient propulsion system 10.

Referring now particularly to FIG. 4, the propulsion system 10 depicted also utilizes the electric machine 14 is an electric motor. For the embodiment of FIG. 4, however, the turboshaft engine 18 is either not operating, or alternatively, is operating at a relatively low power level. For example, in FIG. 4 the turbine engine 22 of the turboshaft engine 18 may apply a second GTE power to the output shaft 24. Similarly, the electric machine 14 (operating as an electric motor) may receive electrical power from the electrical line 81 and convert the electrical power to a mechanical power, i.e., a second EM power, applied to the driveshaft 72 of the propulsor 12. For the embodiment depicted, the second EM power is not within a predetermined threshold of the second GTE power. For example, the second EM power may be greater than, or substantially greater than the second GTE power for the embodiment of FIG. 4. For example, the second EM power may be at least seventy-five percent (75%) greater than the second GTE power. Accordingly, based on the relative power application to the driveshaft 72, the one-way clutch 16 is operable to decouple the output shaft 24 of the turboshaft engine 18 from the driveshaft 72 of the propulsor 12, such that rotation of the driveshaft 72 by the electric machine 14 (operating as an electric motor) does not pass along any rotational power or torque to the output shaft 24 of the turboshaft engine 18.

Such a configuration may allow for a more sustainable and efficient hybrid electric propulsion system 10. For example, such a configuration may allow for the propulsor 12 to be driven substantially completely by the electric machine 14, without rotating the turbine engine 22 the turboshaft engine 18. Accordingly, the turboshaft engine 18, in such an operating mode, does not need to utilize power to operate various accessory systems of the turboshaft engine 18 (such as lubrication systems, heat exchange systems, etc.) that would otherwise be necessary if the output shaft 24 were connected to the driveshaft 72 without use of the one-way clutch 16. With such a configuration, the turboshaft engine 18 would need to siphon power from, e.g., the electric machine 14, or otherwise operate at a minimum power level to run such accessory systems.

Referring now particularly to FIG. 5, the exemplary propulsion system 10 depicted utilizes the electric machine 14 as an electric generator. For the embodiment depicted, the turboshaft engine 18 is operating to supply power to the propulsion system 10, and more particularly, to supply power to the electric machine 14 (operating as an electric generator) as well as to the propulsor 12. For example, the turbine engine 22 the turboshaft engine 18 may apply a third GTE power to the output shaft 24. As the electric machine 14 is not applying any power to the driveshaft 72, based on the relative power application to the driveshaft 72, the one-way clutch 16 is operable to couple the output shaft 24 of the turboshaft engine 18 to the driveshaft 72 of the propulsor 12. As is depicted, the electric machine 14 is operating to convert a portion of the mechanical power applied to the driveshaft 72 by the output shaft 24 (across the one-way clutch 16) to electrical power, i.e., a third EM power. The third EM power may be delivered to a power sink through the electrical line 81, while a remaining amount of the third GTE power may be utilized to drive the propulsor 12.

Such a configuration may allow for the turboshaft engine 18 to operate the propulsor 12 of the propulsion system 10 will still providing electrical power to other systems within the propulsion system 10. For example, in certain exemplary embodiments, the electrical power converted by the electric machine 14 for the embodiment of FIG. 5 may be utilized to store power within one or more energy storage devices (such as batteries). With such a configuration, the energy storage devices may subsequently transfer an amount of such stored power to the electric machine 14 to substantially completely power the propulsor 12 (see, e.g., FIG. 4), or alternatively, to increase an overall amount of power provided to the propulsor 12 (see, e.g., FIG. 3).

Figure 6:
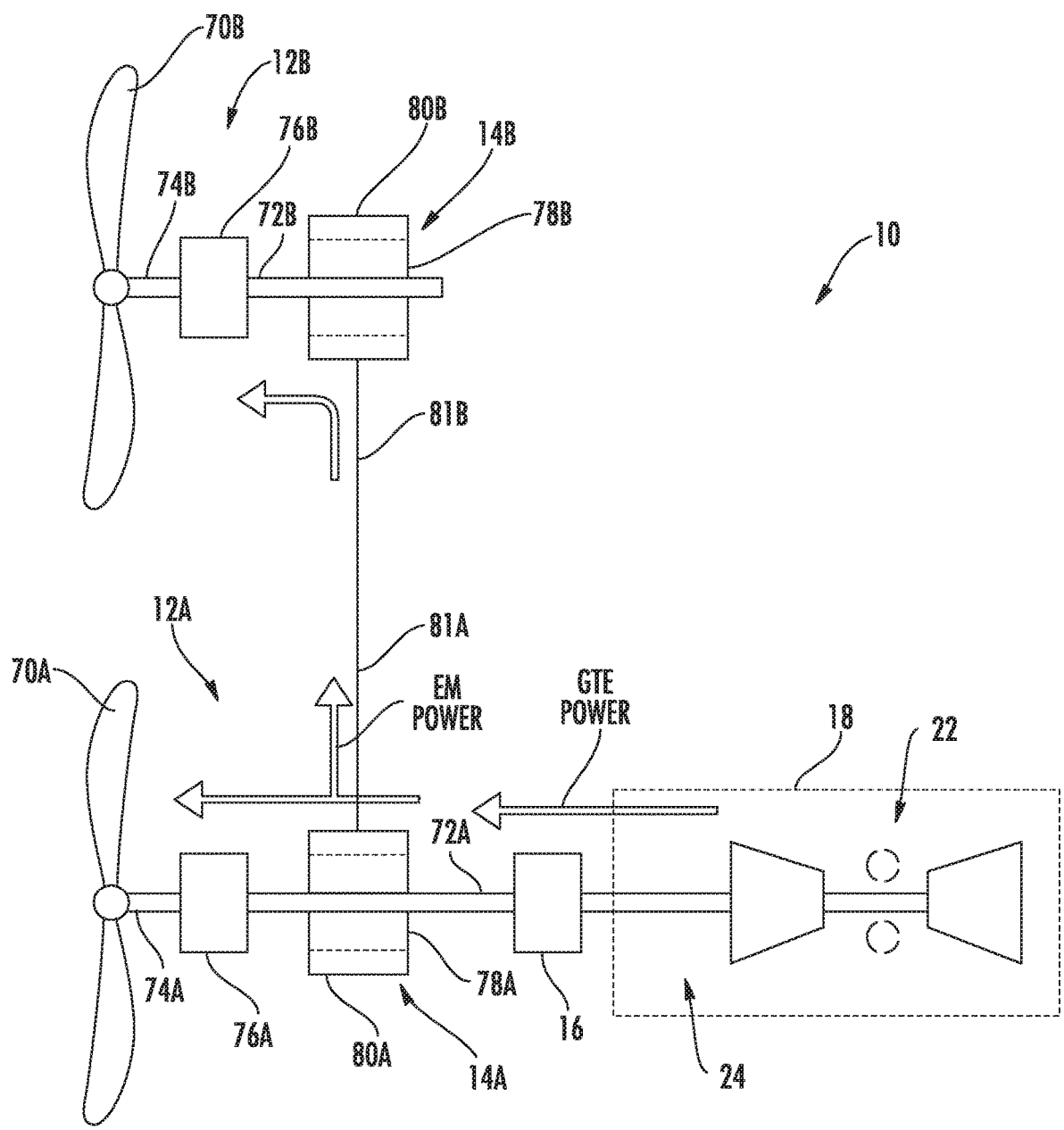
FIG. 6 is a schematic view of a propulsion system in accordance with yet another exemplary embodiment of the present disclosure.

Alternatively, in still other embodiments, the turbine engine 22 and the electric machine 14 of the propulsion system 10 of FIG. 5 may further be used to power other propulsion devices. For example, referring now briefly to FIG. 6, a propulsion system 10 in accordance with still another exemplary embodiment of the present disclosure is provided. The exemplary propulsion system 10 of FIG. 6 is depicted operating in a substantially similar manner to the exemplary propulsion system 10 of FIG. 5. However, for the embodiment of FIG. 6, the propulsor 12 is a first propulsor 12A and the electric machine 14 is a first electric machine 14A. The exemplary propulsion system 10 of FIG. 6 further includes a second propulsor 12B and a second electric machine 14B. The second propulsor 12B, similar to the first propulsor 12A, includes a propeller 70B, a gearbox 76B, and a driveshaft 72B. Additionally, the second electric machine 14B, similar to the first electric machine 14A, is coupled to the driveshaft 72B of the second propulsor 12B and includes a rotor 78B, a stator 80B, and an electrical line 81B. Further, the second electric machine 14B is electrically coupled to the first electric machine 14A via the respective electrical lines 81A, 81B. In such a manner, the second electric machine 14B is powered by the first electric machine 14A, enabling the second electric machine 14B to drive the second propulsor 12B.

Accordingly, with such a configuration, the turboshaft engine 18 of the propulsion system 10 may be utilized to operate a plurality of propulsors 12A, 12B. For example, although the embodiment of FIG. 6 includes two propulsors 12, in other exemplary embodiments, the exemplary propulsion system 10 may include any other suitable number of propulsors 12.

Additionally, it should be appreciated, that although for each of the embodiments described above with reference to FIGS. 1 and 3 through 6, the propulsor 12 is depicted including a propeller 70, in other exemplary embodiments, the propulsor 12 may have any other propulsion device. For example, in other exemplary embodiments, the propulsor 12 may include a ducted or unducted fan. Additionally, although the exemplary propulsion system 10 is described generally as an aeronautical propulsion system 10 including a turboshaft engine, in other exemplary embodiments, the propulsion system 10 may include any other suitable gas turbine engine (e.g., turboprop, turbofan, etc.) or other combustion engine, and the propulsion system 10 may alternatively be configured as, e.g., an aeroderivative propulsion system 10 for land-based or nautical applications.

Moreover, in still other exemplary embodiments, it should be appreciated that the propulsion system 10 may be configured in any other suitable manner. For example, referring now briefly to FIG. 7, a schematic view is provided of a propulsion system 10 which may be configured in substantially the same manner as exemplary propulsion system 10 described above with reference to FIG. 1. Accordingly, the same or similar numbers refer to the same or similar part. More particularly, the exemplary propulsion system 10 depicted in FIG. 7 generally includes a propulsor 12 having a propeller 70, a gearbox 76, and a driveshaft 72; an electric machine 14 coupled to the driveshaft 72 of propulsor 12 and including an electrical line 81; a turboshaft engine 18 including a turbine engine 22 and an output shaft 24 rotatable with, and by, the turbine engine 22; and a one-way clutch 16 operable with at least one of the driveshaft 72 of the propulsor 12 and output shaft 24 of the turboshaft engine 18.

Figure 7:
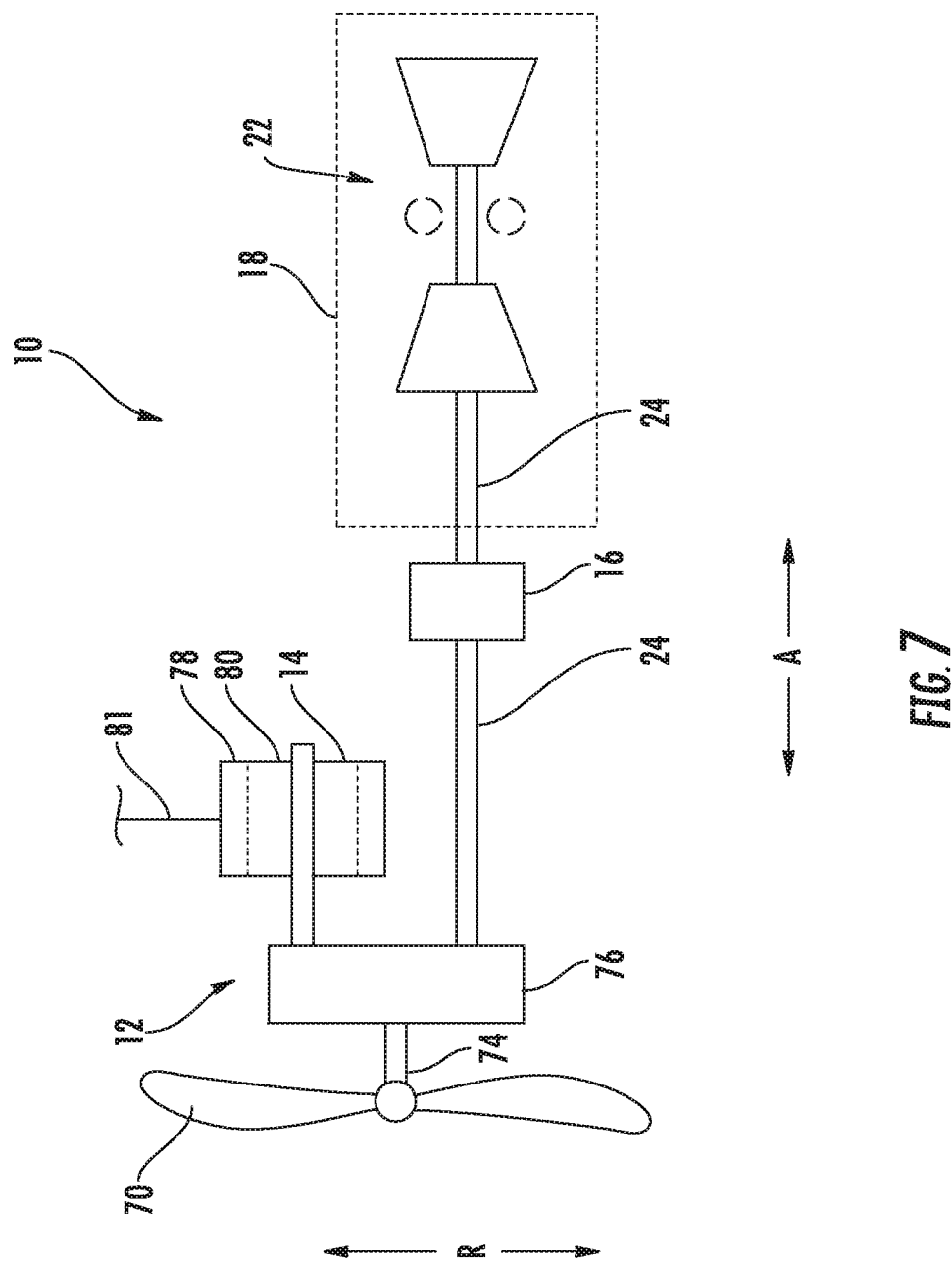
FIG. 7 is a schematic view of a propulsion system in accordance with still another exemplary embodiment of the present disclosure.

However, for the embodiment of FIG. 7, the electric machine 14 is configured in parallel with the output shaft 24 of the turboshaft engine 18. More particularly, the electric machine is operable with the driveshaft 72 of the propulsor 12, which is rotatable with the propeller 70 through the gearbox 76. Additionally, the output shaft 24 of the turboshaft engine 18 is rotatable with the propeller 70 through the gearbox 76. Further, for the embodiment depicted, the one-way clutch 16 is operable with the output shaft 24 of the turboshaft engine 18. In such a manner, the one-way clutch 16 of FIG. 7 may operate in substantially the same manner as the exemplary one-way clutches 16 described above with reference to FIGS. 1 through 6. Notably, in certain embodiments, the output shaft 24 may be formed of a plurality of discrete components.

Figure 8:
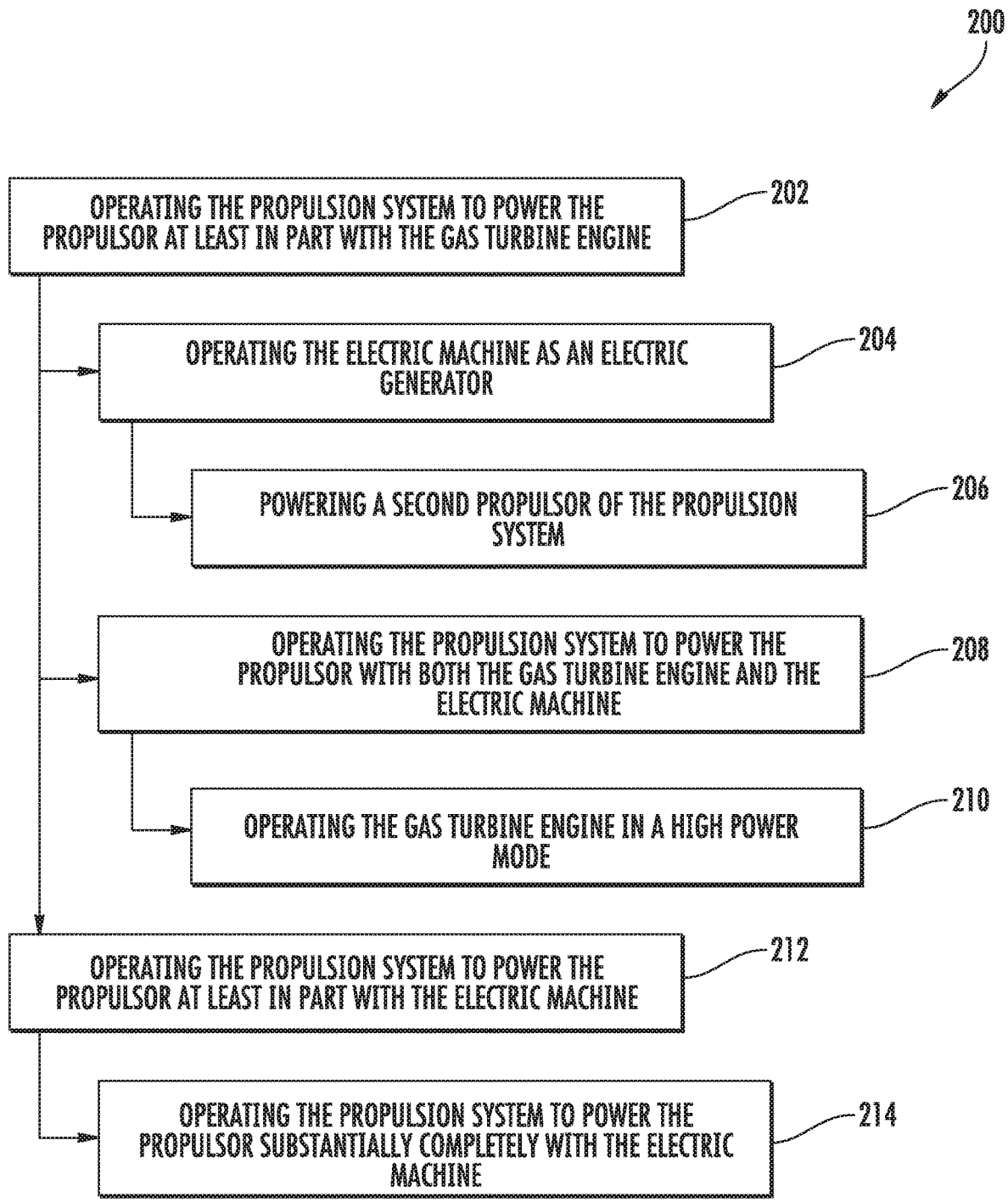
FIG. 8 is a flow diagram of a method for operating a propulsion system in accordance with an exemplary aspect of the present disclosure.

Referring now to FIG. 8, a method (200) of operating a propulsion system in accordance with an exemplary aspect of the present disclosure is provided. The exemplary method (200) may be operable with one or more the exemplary propulsion system described above with reference to FIGS. 1 through 7. Accordingly, the propulsion system may include a propulsor having a driveshaft, an electric machine coupled to the driveshaft, a combustion engine having an output shaft (or in certain exemplary aspects, a gas turbine engine having a turbine engine and an output shaft), and a one-way clutch operable with at least one of the driveshaft propulsor and the output shaft of the gas turbine engine.

As is depicted, the exemplary method (200) generally includes at (202) operating the propulsion system to power the propulsor at least in part with the gas turbine engine such that the one-way clutch couples the output shaft of the gas turbine engine to the driveshaft of the propulsor. More specifically, for the exemplary aspect of FIG. 8, operating the propulsion system to power the propulsor at least in part with the gas turbine engine at (202) includes at (204) operating the electric machine as an electric generator. With such an exemplary aspect, the propulsion system may provide electrical power to, e.g., one or more power storage devices or a separate power sink. Particularly for the exemplary aspect depicted, operating the electric machine as an electric generator at (204) includes at (206) powering a second propulsor of the propulsion system. Such an exemplary aspect may be utilized with, e.g., the exemplary propulsion system described above with reference to FIG. 6.

At a different point and time than (204) and (206), operating the propulsion system to power the propulsor at least in part with the gas turbine engine at (202) further includes at (208) operating the propulsion system to power the propulsor with both the gas turbine engine and the electric machine. Accordingly, operating the propulsion system at (208) includes operating the electric machine as an electric motor. More specifically, for the exemplary aspect of FIG. 8, operating the propulsion system to power the propulsor with both the gas turbine engine and the electric machine at (208) includes at (210) operating the gas turbine engine in a high power mode. For example, the high power mode may be a takeoff operating mode, wherein a maximum amount of power may be desired.

Referring still to FIG. 8, at a different point in time than (202), the exemplary method (200) further includes at (212) operating the propulsion system to power the propulsor at least in part with the electric machine, such that the one-way clutch decouples the output shaft of the gas turbine engine from the driveshaft of the propulsor. Particularly for the exemplary aspect depicted in FIG. 8, operating the propulsion system to power the propulsor at least in part with the electric machine at (212) includes at (214) operating the propulsion system to power the propulsor substantially completely with the electric machine. Accordingly, operating the propulsion system at (212) includes operating the electric machine as an electric motor. As will be appreciated, the one-way clutch transitions from coupling the output shaft to the driveshaft to decoupling the output shaft from the driveshaft automatically based on a torque applied to the output shaft by the gas turbine engine relative to a torque applied to the driveshaft by the electric machine. In such a manner, the one-way clutch may be configured as a passively controlled one-way clutch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft propulsion system comprising:
a driveshaft to rotate a propeller;
an electric machine coupled to the driveshaft;
a turbine engine comprising an output shaft;
a brake operably coupled with the output shaft; and
a one-way clutch positioned between the brake and the electric machine and operable with at least one of the driveshaft and the output shaft of the turbine engine, the one-way clutch allowing for a differential angular velocity of the driveshaft relative to the output shaft in a first circumferential direction and preventing a differential angular velocity of the driveshaft relative to the output shaft in a second circumferential direction, wherein the propeller is positioned on an opposing side of the electric machine from the one-way clutch, and wherein the propeller, the electric machine, the one-way clutch, and the output shaft are coaxial.

2. The propulsion system of claim 1, wherein the one-way clutch is configured to decouple the driveshaft from the output shaft passively based on an angular velocity of the output shaft generated by the turbine engine relative to an angular velocity of the driveshaft generated by the electric machine.

3. The propulsion system of claim 2, wherein the one-way clutch is configured to decouple the driveshaft from the output shaft when the power applied to the driveshaft by the electric machine exceeds the power applied to the output shaft by the turbine engine by a predetermined threshold.

4. The propulsion system of claim 2, wherein the one-way clutch is configured to couple the driveshaft to the output shaft when the power applied to the driveshaft by the electric machine is less than or equal to the power applied to the output shaft by the turbine engine.

5. The propulsion system of claim 4, wherein the propulsor further comprises a gearbox, and wherein the driveshaft is configured for rotating the propeller across the gearbox.

6. The propulsion system of claim 1, wherein the one-way clutch is configured as a mechanical one-way clutch passively controlled by the output shaft and the driveshaft.

7. The propulsion system of claim 1, wherein the one-way clutch is configured as at least one of a sprag clutch or a cam clutch.

8. The propulsion system of claim 1, wherein the driveshaft is configured as a first driveshaft of a first propulsor, wherein the electric machine is a first electric machine, and wherein the propulsion system further comprises:
a second propulsor comprising a second driveshaft; and
a second electric machine coupled to the second driveshaft of the second propulsor for driving the second propulsor, wherein the second electric machine is electrically coupled to the first electric machine and powered by the first electric machine.

9. A method of operating an aircraft propulsion system comprising
a propulsor including
a driveshaft to rotate a propeller,
an electric machine coupled to the driveshaft,
a turbine engine comprising an output shaft,
a brake operably coupled with the output shaft, and
a one-way clutch positioned on an opposing side of the electric machine from the propeller, between the brake and the electric machine, and operable with at least one of the driveshaft and the output shaft, wherein the propeller, the electric machine, the one-way clutch, and the output shaft are coaxial, the method comprising:
operating the propulsion system to power the propulsor at least in part with the turbine engine such that the one-way clutch couples the output shaft of the turbine engine to a first portion of the driveshaft of the propulsor; and
operating the propulsion system to power the propulsor at least in part with the electric machine such that the one-way clutch decouples the output shaft of the turbine engine from the driveshaft of the propulsor, wherein torque is supplied to a second portion of the driveshaft by the electric machine, the second portion of the driveshaft separated from the first portion of the driveshaft and wherein the propulsor is on an opposing side of the electric machine from the one-way clutch and the turbine engine.

10. The method of claim 9, wherein operating the propulsion system to power the propulsor at least in part with the turbine engine further comprises operating the electric machine as an electric generator.

11. The method of claim 10, wherein operating the electric machine as an electric generator comprises powering a second propulsor of the propulsion system.

12. The method of claim 9, wherein operating the propulsion system to power the propulsor at least in part with the turbine engine further comprises operating the propulsion system to power the propulsor with both the turbine engine and the electric machine.

13. The method of claim 12, wherein operating the propulsion system to power the propulsor with both the turbine engine and the electric machine comprises operating the turbine engine in a high power mode.

14. The method of claim 13, wherein the high power mode is a takeoff operating mode.

15. The method of claim 9, wherein the one-way clutch transitions from coupling the output shaft to the driveshaft to decoupling the output shaft from the driveshaft automatically based on a torque applied to the output shaft by the turbine engine relative to a torque applied to the driveshaft by the electric machine.

16. The method of claim 9, wherein the first portion is an end section of the driveshaft and the second portion is a midsection of the driveshaft.

17. An aircraft propulsion system comprising:
a driveshaft;
an electric machine coupled to the driveshaft;
a turbine engine comprising an output shaft;

a one-way clutch coupled to the driveshaft and the output shaft of the turbine engine, wherein the one-way clutch is positioned between the turbine engine and the electric machine;
a propeller coupled to the driveshaft and position on an opposing side of electric machine from one-way clutch, wherein the propeller, the electric machine, the one-way clutch, and the output shaft are coaxial; and
a brake operably coupled with the output shaft, wherein the brake engages the output shaft to slow down the output shaft and disengage the one-way clutch, wherein the brake and the electric machine are separated by the one-way clutch.

\* \* \* \* \*